United States Patent [19]
Landstrom et al.

[11] Patent Number: 5,511,535
[45] Date of Patent: Apr. 30, 1996

[54] BARBECUE GRILL WITH FIRE RETARDING MEANS

[76] Inventors: Peter H. Landstrom, 116 E. Liberty, Barrington, Ill. 60016; Thomas Carpenter, 1185 Jansen Farm Ct., Elgin, Ill. 60120

[21] Appl. No.: 196,275

[22] Filed: Feb. 14, 1994

[51] Int. Cl.⁶ .............................. A47B 96/00; F24C 15/36
[52] U.S. Cl. .................. 126/25 C; 126/25 R; 126/41 R; 169/13; 169/61; 169/65
[58] Field of Search ................ 126/25 R, 25 C, 126/41 R, 299 D, 299 E; 169/13, 61, 65; 431/79

[56] References Cited

U.S. PATENT DOCUMENTS

| | | |
|---|---|---|
| 1,006,210 | 10/1911 | Heid ........................ 126/25 C |
| 3,299,416 | 1/1967 | Koppel . |
| 3,362,586 | 1/1968 | Dedoes . |
| 3,482,922 | 12/1969 | Blackett ...................... 431/79 |
| 3,524,403 | 8/1970 | Treloar ...................... 126/41 X |
| 3,756,140 | 9/1973 | Kolivas ...................... 99/339 |
| 3,825,397 | 7/1974 | Johansson et al. ............ 431/79 |
| 4,028,047 | 6/1977 | Strunz et al. ............. 431/79 X |
| 4,039,844 | 8/1977 | MacDonald . |
| 4,286,633 | 8/1981 | Wackermann ............... 126/25 C |
| 4,287,870 | 9/1981 | Johnson ..................... 126/25 C |
| 4,351,316 | 9/1982 | Kroll ....................... 431/79 X |
| 4,370,125 | 1/1983 | Donnelly et al. ........... 431/79 X |
| 4,395,229 | 7/1983 | Yasuhira et al. ........... 431/79 X |
| 4,402,664 | 9/1983 | Kutrieb ....................... 431/79 |
| 4,435,149 | 3/1984 | Astheimer ..................... 431/12 |
| 4,630,593 | 12/1986 | Gremillion ................ 126/25 R |
| 4,632,089 | 12/1986 | Wardell .................... 126/25 R |
| 4,655,294 | 4/1987 | Turner, Jr. ..................... 169/46 |
| 4,732,137 | 3/1988 | Parsons .................... 126/41 R |
| 4,855,718 | 8/1989 | Cholin et al. .................. 431/13 |
| 5,026,272 | 6/1991 | Takahashi et al. .............. 431/79 |
| 5,031,702 | 7/1991 | Trumbach .................. 169/13 X |
| 5,165,384 | 11/1992 | Knotson ................... 126/25 C |
| 5,353,880 | 10/1994 | Green ........................... 169/65 |

*Primary Examiner*—Carl D. Price
*Attorney, Agent, or Firm*—Michael R. McKenna

[57] ABSTRACT

This invention relates to an improved barbecue grill having a means for retarding excessive flame. In combination with a portable barbecue grill that has a kettle, an automatic means for distributing water onto an excessive flame activated by a photodetector that senses light from the excessive flame.

26 Claims, 5 Drawing Sheets

BARBECUE GRILL WITH FIRE RETARDING MEANS

BACKGROUND OF THE INVENTION

The present invention relates to an improved barbecue grill having a means for retarding an excessive flame which may be produced during the cooking process, incorporating a means for sensing light from the flame and responding to it with the distribution of a fluid fire suppressant to retard the excessive flame. Excessive flames are typically those which create either a safety or a cooking hazard. They can sensed in the planar region below and in proximity to the horizontal grill which supports food being barbecued.

Various modes of fire suppression, including the use of various water supply devices, used in combination with barbecue grills are known in the prior art. In 1911, U.S. Pat. No. 1,006,210 was issued to Held for a dust allaying attachment for furnaces which distributes water from a circular configuration. The device taught relates to dust rather than flame suppression.

In 1968, U.S. Pat. No. 3,362,586 was issued to Dedoes for a barbecue fan fire quenching accessory which physically resembles a portable flash light comprising a fan on one end and a water dispensing nozzle on the other. The accessory taught is manually operated and requires the user to be in proximity to the flames during operation.

Figure 3:
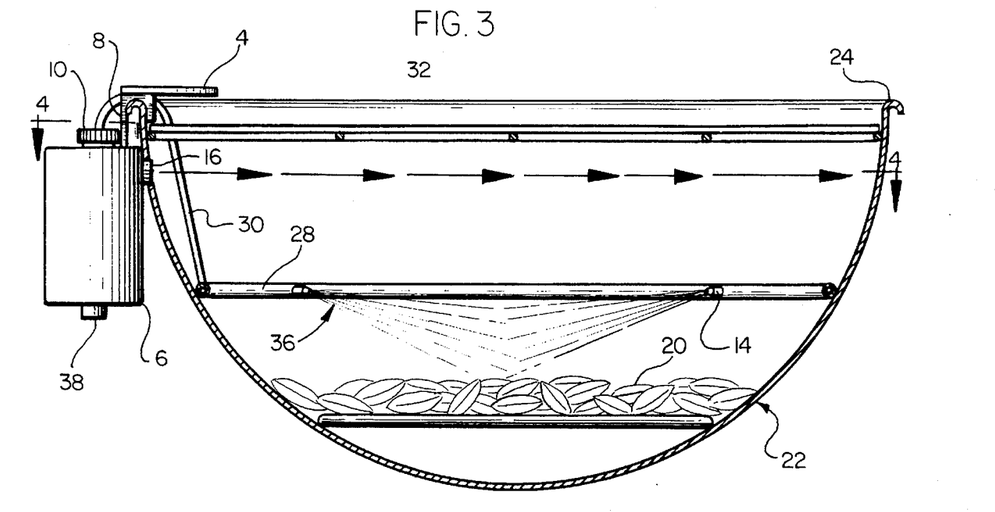
FIG. 3 is a side elevation view of the preferred embodiment of the present invention shown in FIG. 2 with the components of its means for retarding excessive flame engaged to the kettle.

In 1973, U.S. Pat. No. 3,756,140 was issued to Kolivas for a barbecue pit incorporating a built-in flame extinguisher system for extinguishing flames which flare up as a result of hot grease dripping upon the hot coals and the like. In FIG. 3 of the drawing, a flame extinguisher (175) within the barbecue pit is shown. The flame extinguisher includes a conduit having running water therein and terminating at a strategic point within the pit. The protruding end of the conduit is suitable fitted with a nozzle which discharges a fan-shaped spray therefrom. The disadvantage of this device is that it is adapted only to permanently fixed barbecue pits such as the masonry unit shown in the drawing and it only operates manually.

Additionally, a water-cooled safety grate for a barbecue grill is disclosed in U.S. Pat. No. 4,632,089, and in 1987 a kit for extinguishing charcoal fires by submerging the coals in a container of water was revealed in U.S. Pat. No. 4,655,294.

Moreover, two patents dealing with fire retardation are shown in U.S. Pat. Nos. 4,630,593 and 4,281,633. The first employs a fire retardant screen, placed between the charcoal and the cooking fare; and the latter provides an air modulated charcoal cooking container, which can be positioned to snuff out flames. Both inventions require manual operation from a location in proximity to the flames.

In connection with fire detection systems, the use of a flame detector is well known. U.S. Pat. No. 3,299,416 issued to Koppel in 1967 discloses a circuit for an ultra-violet self-checking flame detector. U.S. Pat. No. 3,825,397 issued to Johansson et al. in 1974 reveals the novel use of fiber optics means to transmit light from a burner flame of a car heater further employing a light detector comprising a photo diode, a photocell, a photo resistance or the like.

Flame sensors have been employed in industrial boilers as is shown in U.S. Pat. Nos. 4,039,844, 4,435,149, and 5,026,272. Additionally, tubular optical waive guides are taught in U.S. Pat. No. 4,855,718.

The disadvantages of the foregoing prior art relate to cost and complexity and the disadvantages in having to depend on a powerful power source.

ADVANTAGE OF THIS INVENTION

An advantage of this invention is that it designed to operate with an existing standard barbecue grill. Unlike Heir and Kolivas, this valuable invention can provide a fluid flame retardant directly to the flame without manual intervention (although manual activation is available as described in one of the preferred embodiments), alleviating the possibility of having a barbecuer injured by an excessive flame. Nor will a barbecuer be caught off-guard since the means for sensing will activate the discharge of the fluid flame retardant.

In one of the preferred embodiments of the present invention, the fluid flame retardant discharge is arranged to spray a quantity of water from a circular header to retard an excessive flame that is detected automatically. Moreover, the electrical components of a preferred embodiment of this invention are compatible with a power source of 6–12 volts supplied by batteries.

An even further advantage of the present invention is to be portable allowing the user to move the barbecue grill from place to place and yet provide a new and improved automatic flame retarding feature.

Still yet another advantage of the present invention is to provide a new and improved barbecue grill which provides a means to safely and conveniently retard excessive flames associated with the barbecuing process as compared to the apparatuses and methods of the prior art, while simultaneously overcoming some of the disadvantages normally associated therewith.

SUMMARY OF THE INVENTION

This invention relates to an improved barbecue grill having a means for retarding excessive flame which may be produced during the cooking process. Coupled with a barbecue grill that has a kettle with an upper rim defining an opening into which a cooking fuel such as charcoal may be placed and ignited to produce a flame and a grill for supporting food, a means for distributing a fluid fire suppressant toward an excessive flame in the kettle is provided along with a means for activating comprising an electrical power source, and a means for sensing light from the excessive flame. The electrical power source is connected to power the means for distributing a fluid fire suppressant and the means for sensing light. When an excessive flame produced during the cooking process is sensed by the means for sensing light, it activates the means for distributing a fluid fire suppressant to discharge said fluid fire suppressant toward the excessive flame and thereby retard said excessive flame.

This invention resides not in any one of these features per se, but rather in the particular combination of all of them herein disclosed and claimed and it is distinguished from the prior art in this particular combination of all of its structures for the function specified.

DESCRIPTION OF THE PREFERRED EMBODIMENT

Figure 1:
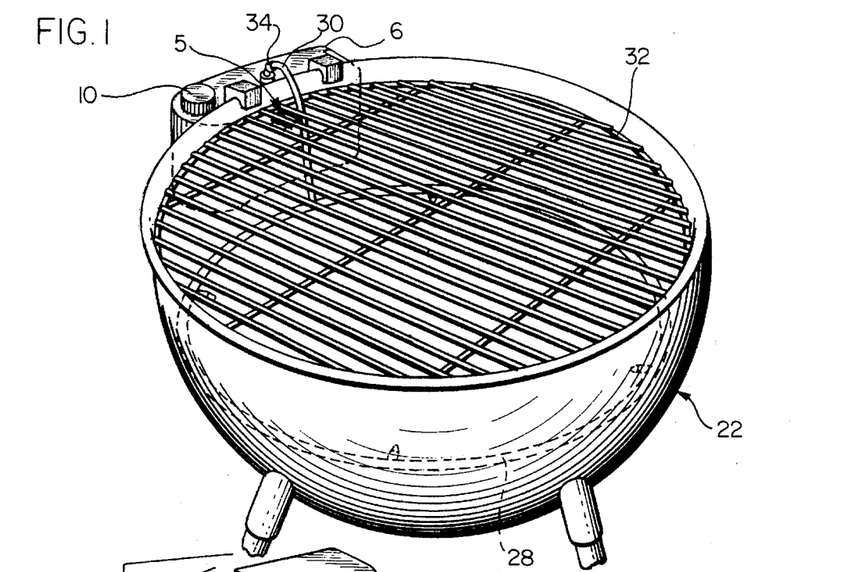
FIG. 1 is a perspective view of a first preferred embodiment of the present invention showing a means for retarding excessive flame positioned relative to the kettle.
Figure 2:
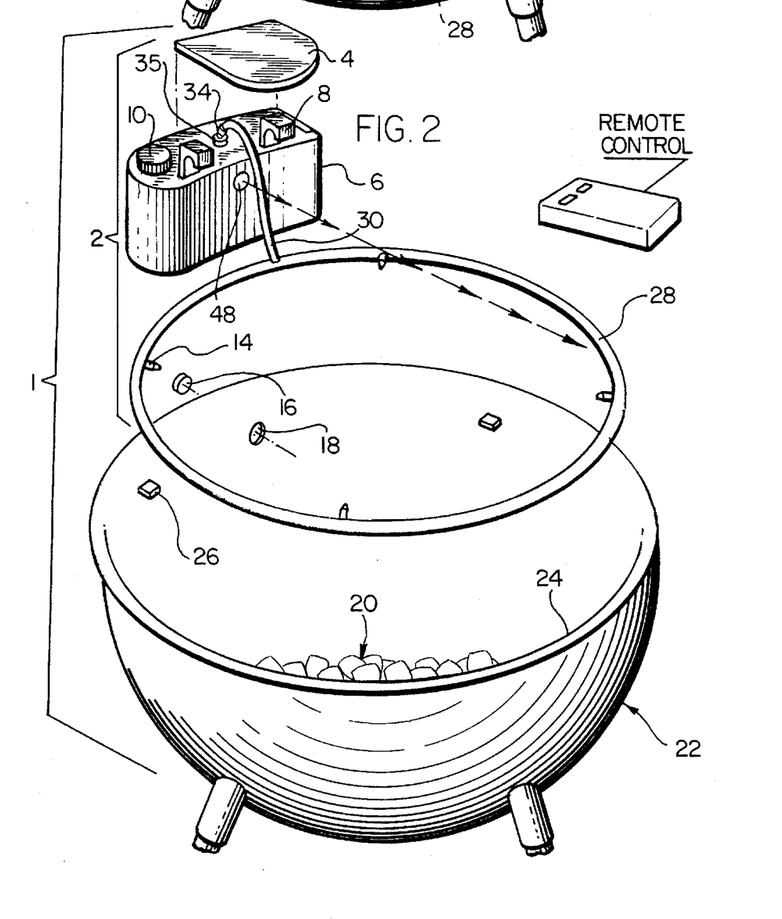
FIG. 2 is an exploded perspective view of a second preferred embodiment of the present invention with the components of its means for retarding excessive flame disengaged from the kettle.

Referring to FIGS. 1 and 2, this invention relates to an improved barbecue grill 1 having a means for retarding excessive flame 2 which may be produced during the cooking process. Coupled with a barbecue grill that has a kettle 22 with an upper rim 24 defining an opening into which a cooking fuel such as charcoal 20, propane, or natural gas, may be placed and ignited to produce a flame and a grill 32 supported by a ledge 25 of the kettle for supporting food, a means for distributing a fluid fire suppressant, comprising a horizontal distribution ring 28, toward an excessive flame in the kettle 22 is provided along with a means for activating comprising an electrical power source, such as a battery 104, and a means for sensing light, such as a photodetector 50, from the excessive flame (See FIG. 5). Alternatively, the means for electrical power may comprise an a.c. power supply cord 131 and an a.c./d.c. transformer 132, collectively identically in FIG. 7 as 130, or a standard solar cell.

The battery 104, or other power source, is connected to power the means for distributing a fluid fire suppressant, such as a pump 12, and the photodetector 50. When an excessive flame produced during the cooking process is sensed by the photodetector 50, it activates the pump 12 to discharge the fluid fire suppressant toward the excessive flame and thereby retard said excessive flame.

The horizontal distribution ring 28 has at least one discharge nozzle 14 that is accessible to and directed generally toward the flame in the kettle 22. The photodetector 50, or other means for sensing light, is optically accessible to the light from the excessive flame produced during the cooking process and it operably responds by signalling the means for activating. The means for activating comprises a means for electrical power, such as a battery 104 which is operably connected to power the pump 12, or other means for distributing a fluid fire suppressant, such as a solenoid valve downstream of a pressurized water source, and the photodetector 50. In that way, an excessive flame produced during the cooking process that is sensed by the photodetector 50 activates the pump 12 to discharge the water from the water reservoir 9 through a pump discharge 35 to a supply line 30 toward the excessive flame and thereby retard said excessive flame.

Figure 8:
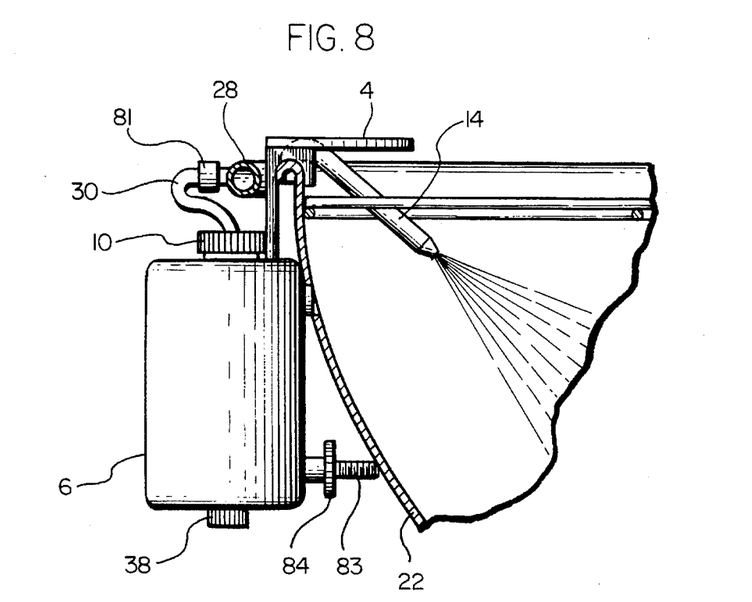
FIG. 8 is an enlarged partial sectional elevation view illustrating a preferred embodiment of the invention showing the horizontal distribution ring disposed outside of the kettle with the nozzles emanating upwardly from the horizontal distribution ring.

In a preferred embodiment of the present invention, the means for sensing light comprises a circuit 100 that is operable to sense the existence of an excessive flame condition to turn on the pump 12 providing a spray of water to douse the flame. As shown in FIG. 8, the line of sight of the means for sensing may be adjusted by means for sensor adjustment comprising a screw 83 and an internally threaded base 84.

Figure 7:
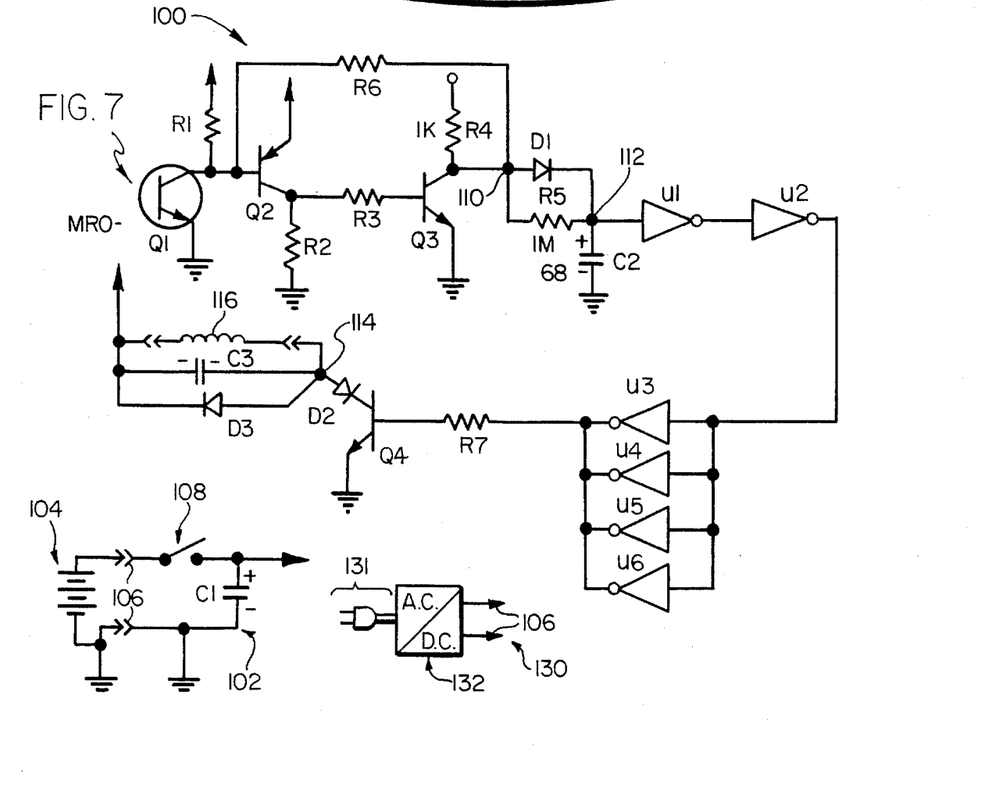
FIG. 7 is a circuit diagram illustrating a preferred embodiment of the invention showing the circuit operable to sense the existence of an excessive flame condition to turn on a pump (or solenoid valve) providing a spray of fluid fire retardant to douse the flame.

The circuit 100 includes a battery-operated power supply circuit 102. The power supply circuit 102 has a six (or twelve) volt battery 104 connected across terminals 106. An on/off switch 108 is connected in series with a filtering capacitor C1 across the terminals 106 to develop six (or twelve) volts power for supplying the remainder of the circuit 100. On skilled in the art could readily modify the circuit for a variety of power supply voltages to accommodated larger volume fire suppressant needs.

An excessive flame condition is sensed by a photodetector Q1 having an emitter connected to ground and a collector connected via a resistor R1 to the power supply circuit 102. The photodetector Q1 may be, for example, a Motorola type MRD701 photodetector with transistor output. The photodetector Q1 is switched on in response to sensed light being above a select level as determined by characteristics of the photodetector.

As an alternative to the photodetector Q1, an analog light sensing device could be used connected to a comparator for comparing sensed light to a user adjustable level, as would be apparent to those skilled in the art.

The collector of the photodetector Q1 is connected to the base of a PNP transistor Q2. The transistor Q2 has its emitter connected to supply. The collector of the transistor Q2 is connected via a resistor R2 to ground and via another resistor R3 to the base of an NPN transistor Q3, the emitter of which is connected to ground. The collector of the transistor Q3 is connected via a resistor R4 to supply and to a junction 110. The junction 110 is connected via a parallel combination of a diode D1 and a resistor R5 to a junction 112. A feedback resistor R6 is connected between the junction 110 and the base of the transistor Q2. The junction 112 is connected via a capacitor C2 to ground and to an inverter U1. The output of the inverter U1 is connected through a second inverter U2, which is in turn connected to four parallel inverters U3, U4, U5 and U6 acting as a buffer. The output of the inverters U3–U6 is connected via a resistor R6 to the base of an NPN transistor Q4 having its emitter connected to ground. The collector of the transistor Q4 is connected through a diode D2 to a junction 114. Connected in parallel between the junction 114 and supply are a pump motor winding 116, a capacitor C3 and a diode D3.

During a normal state, when no flame is being sensed, the photodetector Q1 is off so that the transistors Q2, Q3 and Q4 are off, and the pump motor winding 116 is de-energized. With the transistor Q3 off, the supply is connected through the resistor R4 and the diode D1 to charge the capacitor C2. Thus, the junction 112 is charged to the six (or twelve) volt supply level.

When an excessive amount of light is detected by the photodetector Q1, it turns on, thus turning on the transistor Q2 to in turn turn on the transistor Q3. When the transistor Q3 is turned on, the capacitor C2 discharges through the resistor R5 and the transistor Q3 to ground. This provides a time delay to prevent pump turn on in the event that only a momentary flame is sensed. As the voltage across the capacitor C2 drops, the output of the first inverter U1 goes high, causing the output of the second inverter U2 to go low, which in turn causes the output of the buffer inverters U3–U6 to go high, turning on the transistor Q4. The circuit uses the four inverters U3–U6 to provide sufficient current for driving the transistor Q4. The inverters U1 and U2 are used to square up the signal at the junction 112.

When the transistor Q4 is turned on, the pump 116 is connected between supply and ground to energize the pump 116 and thus commence a spray of water. The capacitor C3 and diode D3 act as a filter to stop inductive spikes and as a clamp to protect from positive voltage spikes. The diode D2 protects from reverse spikes.

As is apparent, the spray of water should quickly douse the flame. Once the flame is doused, the transistor Q1 is turned off so that once the capacitor C2 is charged a sufficient level, the pump motor winding 116 is de-energized. Because the capacitor C2 is charged through the 1K resistor R4, the charge time is virtually instantaneous.

In another preferred embodiment, the circuit may comprise a timing means disposed between said switching means and said sensing means for delaying switching of said switching means a select time duration after sensed light is above the select level to prevent pump turn on if only a momentary flame is sensed.

In another preferred embodiment, the use of photovoltaic cells selenium barrier-layer which are of the self-generating type, with spectral sensitivity chiefly in the visible and near-ultraviolet regions may be employed.

In a preferred embodiment of the present invention as shown in FIG. 2, the kettle 22 has an aperture 18 positioned below the grill 32 and in proximity thereto which serves as a sight opening for the photodetector 50 or the other means for sensing light. For brevity in this description, I will refer to the means for sensing light as the photodetector 50.

As shown in FIGS. 1–4, the photodetector 50 is positioned outside of the kettle in proximity to the aperture. It is arranged to sense excessive flame in a generally horizontal planar region that includes line 7 passing through the aperture 18, below the grill 32 and in proximity thereto. (See particularly FIG. 2.) In a preferred embodiment, a sheet of translucent heat resistant material 16 is positioned in line with the aperture 18 in said kettle 22.

In the first preferred embodiment of the present invention as shown in FIG. 1, the means for sensing further comprises a means for shielding the photodetector from sunlight, such as the lip 5 shown in FIG. 1, positioned through the aperture 18 in the kettle 22 to prevent sunlight from interfering with the photodetector 50. In a second preferred embodiment, the means for shielding is shown in FIG. 2, as step 4 affixed to the top of the attachment hooks 8. Preferred features for the circuit under the contemplated operating conditions is that it would have a heat resistant coating and auxiliary fan cooling.

Figure 5:
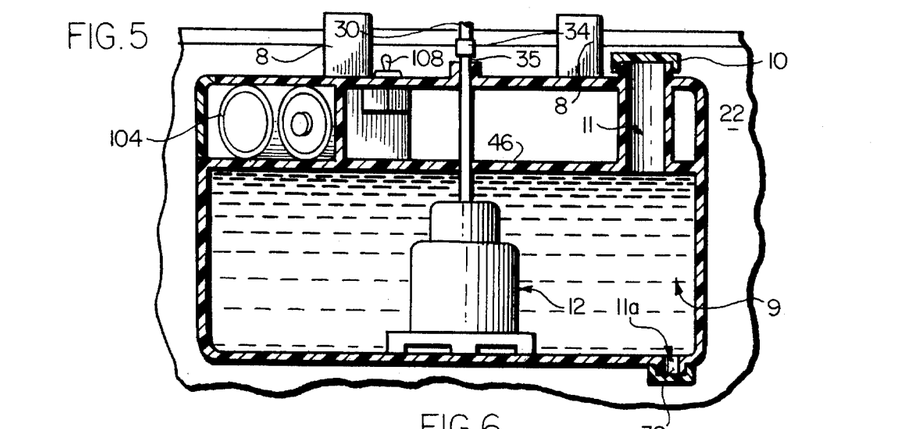
FIG. 5 is an enlarged sectional view taken along the line 5-5 of FIG. 4, showing details of the arrangement of components within full length of casing 6 (but excluding the sun shield 4 of FIG. 2) of the second preferred embodiment.
Figure 6:
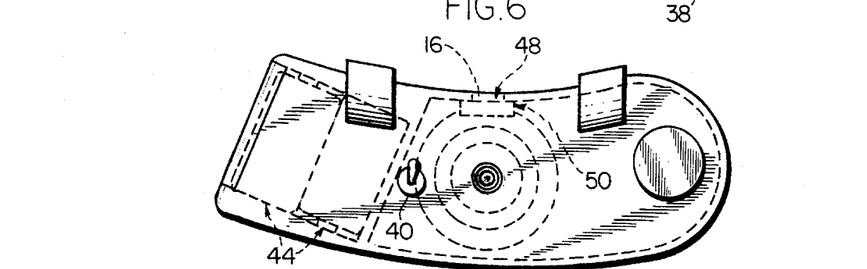
FIG. 6 is a horizontal top plan view of the preferred embodiment of FIG. 5 taken along the line 4-4 of FIG. 3.

In a preferred embodiment of the present invention, the means for distributing a fluid fire suppressant further comprises a reservoir 9, with an inlet 11 having a cap 10 and an outlet 11a having an outlet cap 38, for storing water and an electrically powered pump 12. Said cap 10 may be adapted with a means for intaking air into the water reservoir. A 6 volt miniature water pump, such as one made by Edmund Scientific Co., model 50,345, which pumps 1 pint per minute at 12 inch head is a preferred selection for use with a single nozzle discharge. For embodiments having a plurality of nozzles, an Atwood Boat Bilge Pump having a 360 gph rating at 12 volts is more than adequate. As shown in FIG. 5, these components have been arranged in a casing 6 which further contains the power source 104 for the apparatus, here two batteries 44 and a manual activation switch 108 disposed through casing penetration 40. It is contemplated that both manual and automatic flame sensing activation may be employed. A preferred feature to insure the availability of a sufficient quantity of fluid fire suppressant is to construct the casing 6 out of a translucent material where the level of fluid can be observed. Alternatively, a reservoir low level indicator may be provided. As shown in FIGS. 5 and 6, there is a separating wall 46 between the water reservoir 9 and the power source and switch.

In another preferred embodiment where the pump is positioned outside of the kettle, the pump discharge may be arranged and adapted to pass through an opening in the kettle wall.

As shown in FIG. 6, the casing 6 further contains the photodetector 50 which sees through an opening 48 in a wall of the casing 6. The casing 6 may be made of a ceramic material or another heat resistant material and may be supported by at least one hanger 8 which may be disposed on the upper rim 24 of the kettle 22, as shown in FIGS. 2 and 3.

Not shown in the drawing is a preferred embodiment wherein the means for activating comprises a remote transmitter and a receiver operably connected to the electrically powered pump to activate the apparatus remotely.

Figure 4:
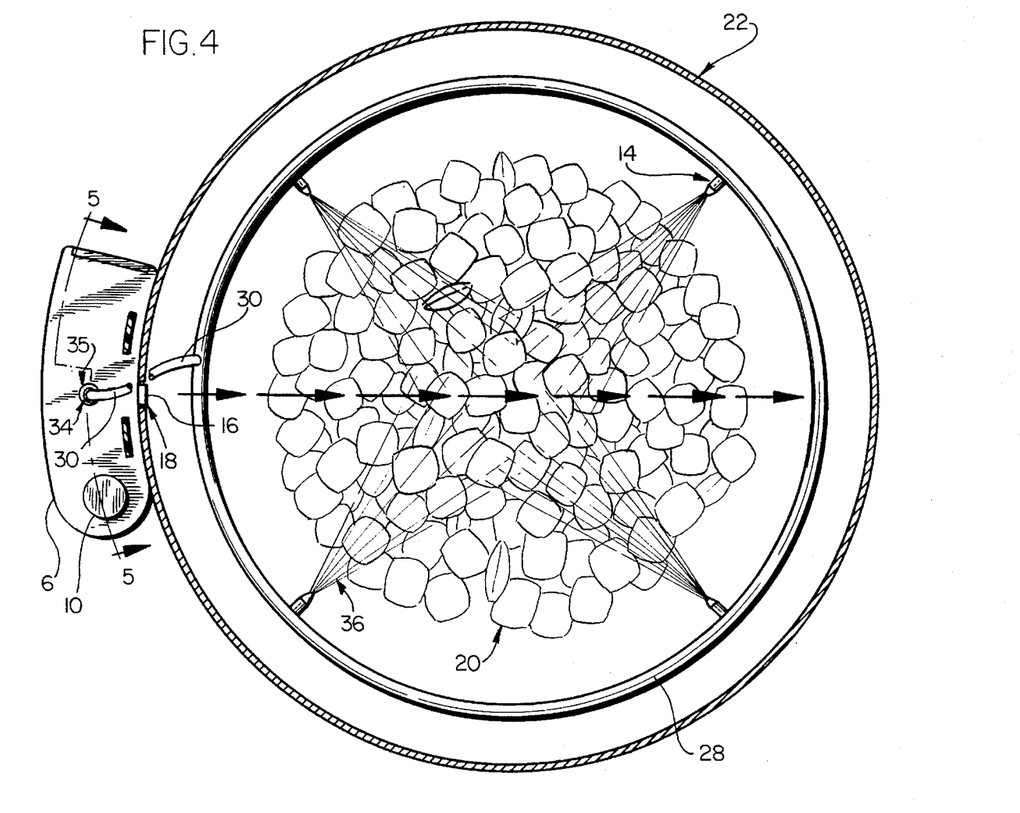
FIG. 4 is a horizontal sectional top plan view of the preferred embodiment along the line 4—4 of FIG. 3 (with the line 30 partially shown for added clarity)

Referring to FIG. 2, a preferred embodiment comprises a horizontal distribution ring 28 having a plurality of discharge nozzles 14 through which the fluid discharge 36 is disbursed, as shown in FIG. 4. Referring to FIG. 5, the supply line 30 to the distribution ring 28 may be integral with the pump discharge line 35 or a line connector 34 connecting same. Water reservoir 9 is separated from the power source by a dividing wall 46.

As an alternative to the water reservoir and pump, a preferred embodiment of this invention may comprise a supply hose connected to a source of water and an electrically powered solenoid valve.

Figure 9:
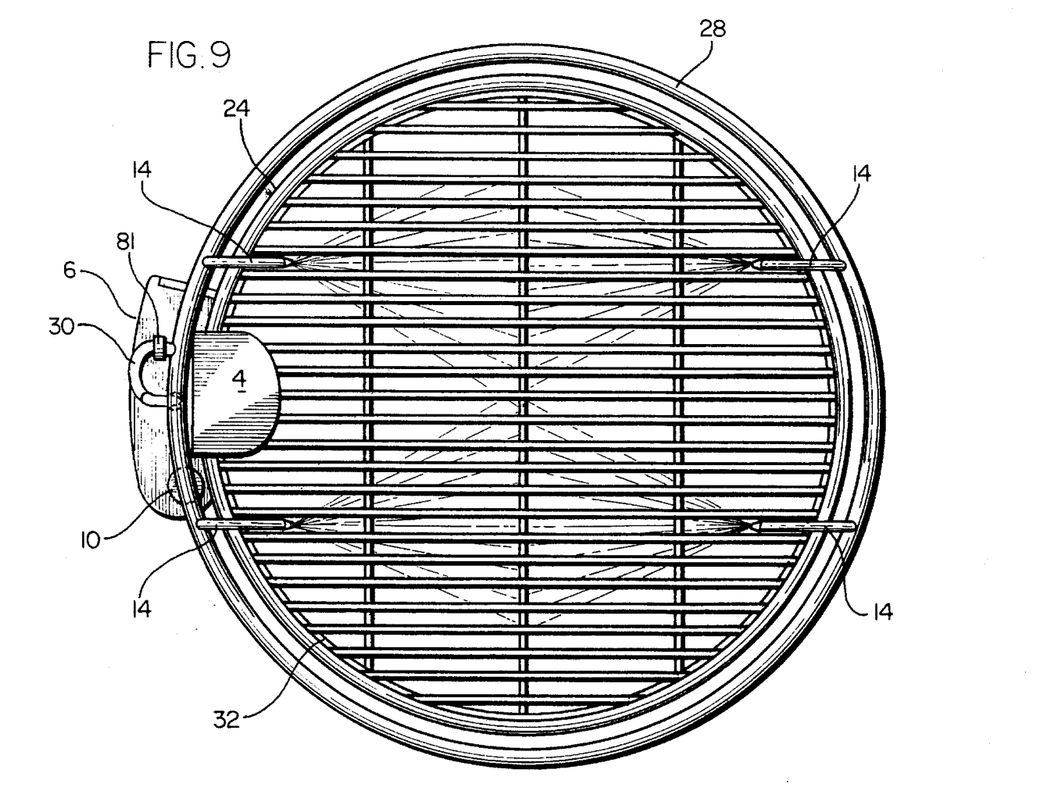
FIG. 9 is a top plan view of the preferred embodiment of the invention that is partially shown in FIG. 8.

Referring to FIGS. 8 and 9, a preferred embodiment of this invention is shown in which the horizontal distribution ring 28 is disposed outside of the kettle 22. A check valve 81 is employed on pump discharge to maintain a quantity of water said horizontal distribution ring 28 where each of the nozzles is connected to a supply line which emanates upwardly from the horizontal distribution ring, so as to maintain a supply of water in said horizontal distribution ring 28. Alternatively, maintenance of water in the horizontal distribution ring could be accomplished using a check valve integrally connected to the reservoir cap and low pressure valves on the nozzles. In such embodiments, employing a water supply line, a pressure regulated solenoid valve may be employed to maintain a charged condition in the horizontal distribution ring.

Figure 10:
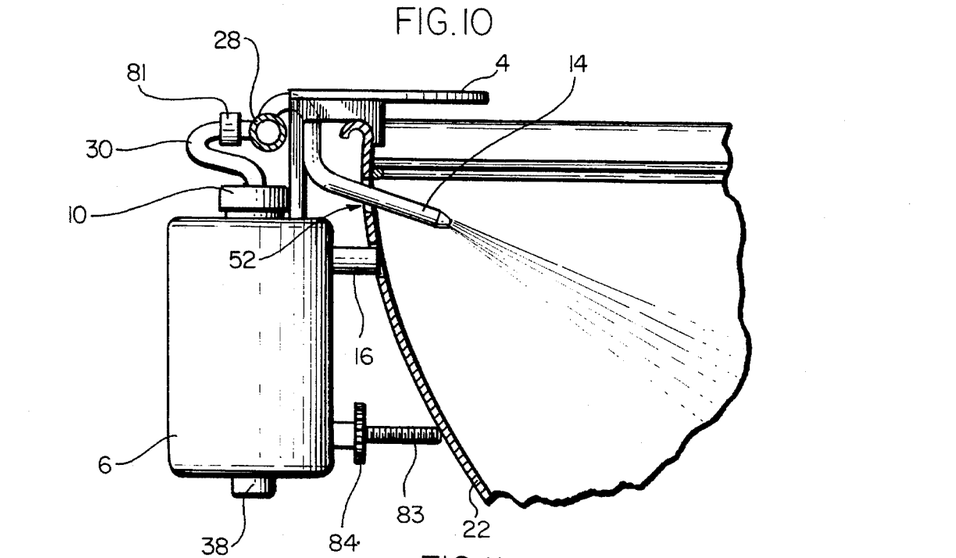
FIG. 10 is an enlarged partial sectional elevation view illustrating a preferred embodiment of the invention showing the horizontal distribution ring disposed outside of the kettle with the nozzles emanating upwardly from the horizontal distribution ring and each nozzle entering the kettle through one of a plurality of apertures in the kettle wall.
Figure 11:
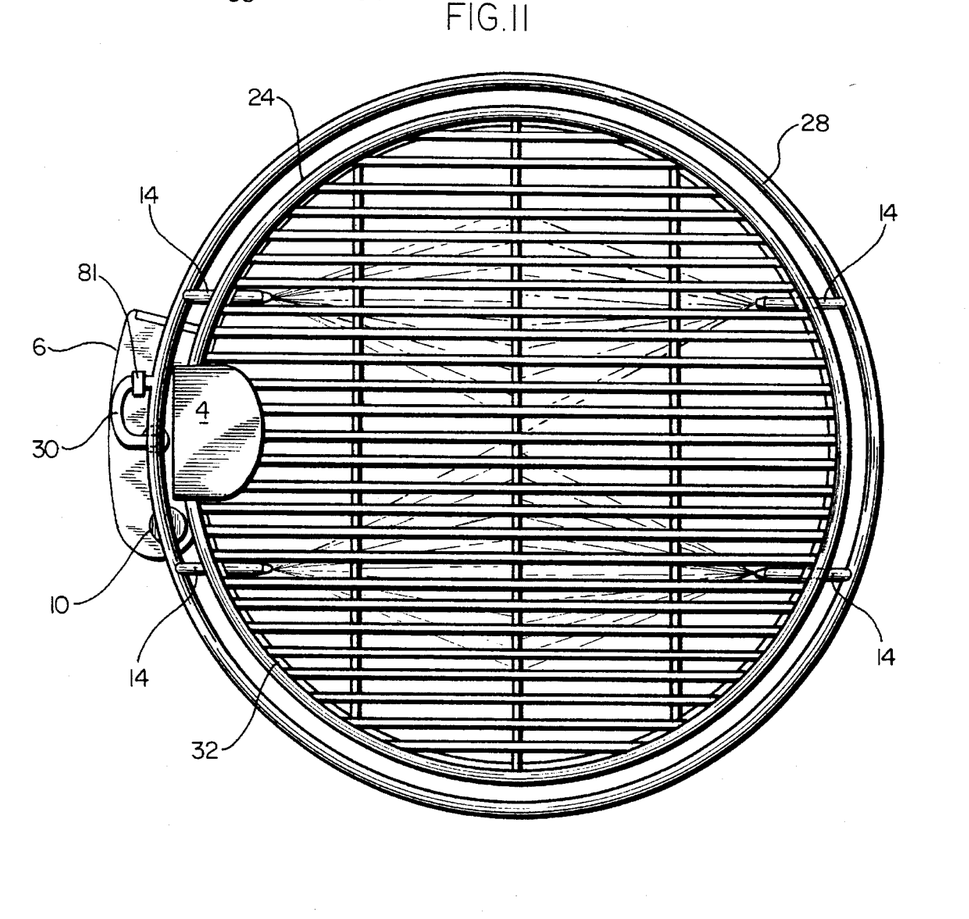
FIG. 11 is a top plan view of the preferred embodiment of the invention that is partially shown in FIG. 10.

In a preferred embodiment of the invention, the horizontal distribution ring is disposed outside of the kettle. As shown in FIGS. 10 and 11, the kettle may have a plurality of apertures 52, each of which is arranged and adapted to provide access for one of the nozzle assemblies.

Additionally, a preferred embodiment of this invention may easily be adapted to an existing barbecue grill having a kettle with an upper rim that is arranged and adapted to hold cooking fuel such as charcoal which may be ignited in the bottom hollow thereof to produce a flame, and a grill for supporting food in a generally horizontal plane located in proximity to said upper rim and above the cooking fuel.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawing and descriptive matter in which there is illustrated preferred embodiments of the invention.

What is claimed as being new and desired to be protected by Letters Patent of the United States is a follows:

1. An excessive flame retarding system, for use with a barbecue grill that has a kettle with an upper rim that is arranged and adapted to hold cooking fuel which may be ignited in the bottom hollow thereof to produce a flame and a grill for supporting food in a generally horizontal plane located in proximity to said upper rim and above the cooking fuel, comprising:

a. a means for distributing a fluid fire suppressant having at least one discharge nozzle, accessible to and directed generally toward the flame in said kettle,
      said means for distributing a fluid fire suppressant further comprises a generally horizontal distribution member disposed outside of the kettle;
   b. a means for sensing light being optically accessible to and operably responsive to the light from an excessive flame produced during the cooking process and operably connected to a means for activating;
   c. the means for activating having a means for electrical power,
      said means for electrical power being operably connected to power the means for distributing a fluid fire suppressant and the means for sensing light; and
   d. a means for maintaining a quantity of water in said generally horizontal distribution member,
      whereby, an excessive flame produced during the cooking process that is sensed by the means for sensing light activates the means for distributing a fluid fire suppressant to discharge said fluid fire suppressant toward the excessive flame and thereby retard said excessive flame.

2. An excessive flame retarding system, as set forth in claim 1, wherein a. the kettle has and an aperture positioned below the grill and in proximity thereto which serves as a sight opening for the means for sensing light,
      said means for sensing light being positioned outside of the kettle in proximity to the aperture and arranged to sense excessive flame in a generally horizontal planar region below the grill and in proximity thereto;
   b. a sheet of translucent heat resistant material is positioned in line with the aperture in said kettle; and
   c. the means for sensing further comprises a means for shielding from sunlight positioned in proximity to the aperture to prevent sunlight from interfering with said means for sensing.

3. An excessive flame retarding system, as set forth in claim 2, wherein the means for sensing light comprises a circuit operable to sense the existence of an excessive flame condition to turn on a pump providing a spray of fluid fire retardant to douse the flame, the circuit having:

a. a battery operated power supply circuit;
   b. sensing means for sensing light being above a select level, indicating the existence of an excessive flame condition, and developing an output having a first or second state dependent on sensed light being, respectively, above or below the select level;
   c. switching means operatively coupled to said sensing means and said pump and being driven by the sensing for energizing said pump only if the output is at the first state; and
   d. the sensing means, the switching means and the pump being powered by the supply circuit.

4. An excessive flame retarding system, as set forth in claim 3, wherein the means for distributing a fluid fire suppressant further comprises:

a. a reservoir for storing the fluid fire suppressant and an electrically powered pump; and
   b. a horizontal distribution ring having a plurality of discharge nozzles.

5. An improved barbecue grill of the type, in which a kettle having an upper rim defining an opening is arranged and adapted to hold cooking fuel which may be ignited in the bottom hollow thereof to produce a flame, and in which said kettle further has a grill for supporting food in a generally horizontal plane located in proximity to said upper rim and above the cooking fuel, wherein the improvement comprises a means for retarding excessive flame which may be produced during the cooking process comprising:

a. a means for distributing a fluid fire suppressant having at least one discharge nozzle accessible to and directed generally toward the flame in said kettle,
      said means for distributing a fluid fire suppressant further comprises a reservoir for storing the fluid fire suppressant and an electrically powered pump;
   b. a means for sensing light being optically accessible to and operably responsive to the light from an excessive flame produced during the cooking process and operably connected to a means for activating,
      said means for sensing light comprises a circuit operable to sense the existence of an excessive flame condition to turn on a pump providing a spray of fluid fire retardant to douse the flame wherein:
      said circuit comprises a battery-operated power supply circuit having a six volt battery connected across terminals and an on/off switch connected in series with a filtering capacitor across the terminals to develop six volt power for supplying the remainder of the circuit,
      said circuit further comprises a photodetector having an emitter connected to ground and a collector connected via a first resistor to the power supply circuit, said photodetector having a transistor output that is switched on in response to sensed light being above a select level, said collector of the photodetector is connected to the base of a PNP transistor having its collector connected to supply and its emitter connected via a second resistor to ground and via a third resistor to the base of a first NPN transistor, the emitter of which is connected to ground, said collector of the first NPN transistor is connected via a 1K resistor to supply and to a first junction which is connected via a parallel combination of a first diode and a fourth resistor to a second junction, said circuit further comprises a feedback resistor connected between the first junction and the base of the PNP transistor, the second junction is connected via a first capacitor to ground and to a first inverter, the output of which is connected through a second inverter, which is in turn connected to four parallel inverters acting as a buffer, said first and second inverters are used to square up the signal at the second junction, the output of the four parallel inverters is connected via a fifth resistor to the base of a second NPN transistor having its emitter connected to ground and its collector connected through a diode to a third junction which has a pump motor winding, a second capacitor and a second diode connected in parallel between said third junction and the supply, whereby, during a normal state, when no flame is being sensed, the photodetector is off so that the transistors are off, the pump motor winding is de-energized, and the supply is connected through the 1K resistor and the first diode to charge the first capacitor and with the second junction charged to the six volt supply level, whereby, during an excited state, when an excessive amount of light is detected by the photodetector, it turns on, thus turning on the PNP transistor to in turn turn on the first NPN transistor during which the first capacitor discharges through the fourth resistor and the first NPN transistor to ground, providing a time delay to prevent pump turn on in the event that only a momentary flame is sensed, and wherein as the voltage across the first capacitor drops, the output of the first inverter goes high, causing the output of the second inverter to go low, which in turn causes the output of the four parallel inverters to go high providing sufficient current for turning on and driving the second NPN transistor, whereby the pump is connected between supply and ground to energize the pump and thus commence a spray of fluid fire retardant, whereby, the second capacitor and the second diode act as a filter to stop inductive spikes and as a clamp to protect from positive voltage spikes with the diode protecting from reverse spikes, and whereby, after the spray of fluid fire retardant douses the flame, the photodetector is turned off so that once the first capacitor is charged through the 1K resistor to a sufficient level, the pump motor winding is de-energized and the circuit returns to normal state;

c. the means for activating having a means for electrical power, said means for electrical power being operably connected to power the means for distributing a fluid fire suppressant and the means for sensing light, and whereby, an excessive flame produced during the cooking process that is sensed by the means for sensing light activates the means for distributing a fluid fire suppressant to discharge said fluid fire suppressant toward the excessive flame and thereby retard said excessive flame.

6. An improved barbecue grill of the type, in which a kettle having an upper rim defining an opening is arranged and adapted to hold cooking fuel which may be ignited in the bottom hollow thereof to produce a flame, and in which said kettle further has a grill for supporting food in a generally horizontal plane located in proximity to said upper rim and above the cooking fuel, wherein the improvement comprises a means for retarding excessive flame which may be produced during the cooking process comprising:

a. a means for distributing a fluid fire suppressant having at least one discharge nozzle accessible to and directed generally toward the flame in said kettle,
said means for distributing a fluid fire suppressant further comprises a horizontal distribution ring having a plurality of discharge nozzles;

b. a means for maintaining a quantity of water in said horizontal distribution ring and wherein the horizontal distribution ring is disposed outside of the kettle;

c. a means for sensing light being optically accessible to and operably responsive to the light from an excessive flame produced during the cooking process and operably connected to a means for activating;

d. the means for activating having a means for electrical power,
said means for electrical power being operably connected to power the means for distributing a fluid fire suppressant and the means for sensing light; and
whereby, an excessive flame produced during the cooking process that is sensed by the means for sensing light activates the means for distributing a fluid fire suppressant to discharge said fluid fire suppressant toward the excessive flame and thereby retard said excessive flame.

7. An improved barbecue grill as set forth in claim 6, wherein the means for maintaining a quantity of water in said horizontal distribution ring comprises a check valve disposed on the discharge of the pump and a plurality of nozzle assemblies, each of which comprises a supply line which emanates upwardly from the horizontal distribution ring connected respectively to one of the discharge nozzles.

8. An improved barbecue grill as set forth in claim 7, wherein the kettle has a plurality of apertures, each of which is arranged and adapted to provide access for one of the nozzle assemblies.

9. An improved barbecue grill of the type, in which a kettle having an upper rim defining an opening is arranged and adapted to hold cooking fuel which may be ignited in the bottom hollow thereof to produce a flame, and in which said kettle further has a grill for supporting food in a generally horizontal plane located in proximity to said upper rim and above the cooking fuel, wherein the improvement comprises a means for retarding excessive flame which may be produced during the cooking process comprising:

a. a means for distributing a fluid fire suppressant having at least one discharge nozzle accessible to and directed generally toward the flame in said kettle,
   said means for distributing a fluid fire suppressant further comprises a generally horizontal distribution member disposed outside of the kettle;
b. a means for maintaining a quantity of water in said generally horizontal distribution member;
c. a means for activating having a means for electrical power,
   said means for electrical power being operably connected to power the means for distributing a fluid fire suppressant; and
   whereby, the means for distributing a fluid fire suppressant to discharge said fluid fire suppresssant toward the flame and thereby retard the flame.

10. The improved barbecue grill as set forth in claim 3, wherein the means for sensing light comprises a circuit operable to sense the existence of an excessive flame condition to turn on a pump providing a spray of fluid fire retardant to douse the flame, the circuit having:
   a. a battery operated power supply circuit;
   b. sensing means for sensing light being above a select level, indicating the existence of an excessive flame condition, and developing an output having a first or second state dependent on sensed light being, respectively, above or below the select level;
   c. switching means operatively coupled to said sensing means and said pump being driven by the sensing means for energizing said pump only if the output is at the first state; and
   d. the sensing means, the switching means and the pump being powered by the supply circuit.

11. The improved barbecue grill as set forth in claim 10, wherein said sensing means comprises a photodetector.

12. The improved barbecue grill as set forth in claim 10, wherein the circuit further comprises a timing means disposed between said switching means and said sensing means for delaying switching of said switching means a select time duration after sensed light is above the select level to prevent pump turn on if only a momentary flame is sensed.

13. An improved barbecue grill as set forth in claim 10, wherein the means for distributing a fluid fire suppressant further comprises a supply hose connected to a source of water and an electrically powered solenoid valve operably connected to the circuit.

14. An improved barbecue grill of the type, in which a kettle having an upper rim defining an opening is arranged and adapted to hold cooking fuel which may be ignited in the bottom hollow thereof to produce a flame, and in which said kettle further having a grill for supporting food in a generally horizontal plane located in proximity to said upper rim and above the cooking fuel, wherein the improvement comprises a means for retarding excessive flame which may be produced during the cooking process comprising:
   a. a means for distributing a fluid fire suppressant having at least one discharge nozzle accessible to and directed generally toward the flame in said kettle,
   said means for distributing a fluid fire suppressant further comprises a generally horizontal distribution member disposed outside of the kettle;
   b. a means for sensing light being optically accessible to and operably responsive to the light from an excessive flame produced during the cooking process and operably connected to a means for activating;
   c. the means for activating having a means for electrical power,
   said means for electrical power being operably connected to power the means for distributing a fluid fire suppressant and the means for sensing light; and
   d. a means for maintaining a quantity of water in said generally horizontal distribution member,
   whereby, an excessive flame produced during the cooking process that is sensed by the means for sensing light activates the means for distributing a fluid fire suppressant to discharge said fluid fire suppressant toward the excessive flame and thereby retard said excessive flame.

15. An improved barbecue grill as set forth in claim 14, wherein the kettle has an aperture positioned below the grill and in proximity thereto which serves as a sight opening for the means for sensing light, and
   said means for sensing light being positioned outside of the kettle in proximity to the aperture and arranged to sense excessive flame in generally horizontal planar region below the grill and in proximity thereto.

16. An improved barbecue grill as set forth in claim 15, wherein a sheet of translucent heat resistant material is positioned in line with the aperture in said kettle.

17. An improved barbecue grill as set forth in claim 16, wherein
   a. the means for distributing a fluid fire suppressant further comprises:
      (1) a reservoir for storing the fluid fire suppressant and an electrically powered pump,
      (2) a horizontal distribution ring having a plurality of discharge nozzles;
   b. the means for sensing light comprises a circuit operable to sense the existence of an excessive flame condition to turn on a pump providing a spray of fluid fire retardant to douse the flame, the circuit having:
      (1) a battery operated power supply circuit,
      (2) a photodetector for sensing light being above a select level, indicating the existence of an excessive flame condition, and developing an output having a first or second state dependent on sensed light being, respectively, above or below the select level,
      (3) switching means operatively coupled to said photodetector and said pump and being driven by the photodetector for energizing said pump only if the output is at the first state, and
      (4) the photodetector, the switching means and the pump being powered by the supply circuit; and
   c. the means for sensing further comprises a means for shielding the photodetector from sunlight positioned in proximity to the aperture to prevent sunlight from interfering with said for sensing.

18. An improved barbecue grill as set forth in claim 14, wherein the means for distributing a fluid fire suppressant further comprises a reservoir for storing the fluid fire suppressant and an electrically powered pump.

19. An improved barbecue grill as set forth in claim 18, wherein the means for electrical power comprises at least one battery.

20. An improved barbecue grill as set forth in claim 18, wherein the means for activating comprises a manually operated switch.

21. An improved barbecue grill as set forth in claim 18, wherein the means for activating comprises a remote transmitter and a receiver operably connected to the electrically powered pump.

22. An improved barbecue grill as set forth in claim 18, wherein the means for electrical power comprises an a.c. power supply cord and an a.c./d.c. transformer.

23. An improved barbecue grill as set forth in claim 18, wherein the means for sensing light comprises a circuit operable to sense the existence of an excessive flame condition to turn on a pump providing a spray of fluid fire retardant to douse the flame wherein:

a. said circuit comprises a battery-operated power supply circuit having a six volt battery connected across terminals and an on/off switch connected in series with a filtering capacitor across the terminals to develop six volt power for supplying the remainder of the circuit;
  b. said circuit further comprises a photodetector having an emitter connected to ground and a collector connected via a first resistor to the power supply circuit,
    (1) said photodetector having a transistor output that is switched on in response to sensed light being above a select level,
       said collector of the photodetector is connected to the base of a PNP transistor having its collector connected to supply and its emitter connected via a second resistor to ground and via a third resistor to the base of a first NPN transistor, the emitter of which is connected to ground;
       said collector of the first NPN transistor is connected via a 1K resistor to supply and to a first junction which is connected via a parallel combination of a first diode and a fourth resistor to a second junction;
  c. said circuit further comprises a feedback resistor connected between the first junction and the base of the PNP transistor;
    (1) the second junction is connected via a first capacitor to ground and to a first inverter, the output of which is connected through a second inverter, which is in turn connected to four parallel inverters acting as a buffer,
       said first and second inverters are used to square up the signal at the second junction,
       the output of the four parallel inverters is connected via a fifth resistor to the base of a second NPN transistor having its emitter connected to ground and its collector connected through a diode to a third junction which has a pump motor winding, a second capacitor and a second diode connected in parallel between said third junction and the supply,
    whereby, during a normal state, when no flame is being sensed, the photodetector is off so that the transistors are off, the pump motor winding is de-energized, and the supply is connected through the 1K resistor and the first diode to charge the first capacitor and with the second junction charged to the six volt supply level;
    whereby, during an excited state, when an excessive amount of light is detected by the photodetector, it turns on, thus turning on the PNP transistor to in turn turn on the first NPN transistor during which the first capacitor discharges through the fourth resistor and the first NPN transistor to ground, providing a time delay to prevent pump turn on in the event that only a momentary flame is sensed, and wherein as the voltage across the first capacitor drops, the output of the first inverter goes high, causing the output of the second inverter to go low, which in turn causes the output of the four parallel inverters to go high providing sufficient current for turning on and driving the second NPN transistor, whereby the pump is connected between supply and ground to energize the pump and thus commence a spray of fluid fire retardant;
    whereby, the second capacitor and the second diode act as a filter to stop inductive spikes and as a clamp to protect from positive voltage spikes with the diode protecting from reverse spikes; and
    whereby, after the spray of fluid fire retardant douses the flame, the photodetector is turned off so that once the first capacitor is charged through the 1K resistor to a sufficient level, the pump motor winding is de-energized and the circuit returns to normal state.

24. An improved barbecue grill as set forth in claim 14, wherein the means for sensing further comprises a means for shielding the photodetector from sunlight positioned in proximity to the aperture to prevent sunlight from interfering with said means for sensing.

25. The improved barbecue grill as set forth in claim 14, wherein the horizontal distribution member comprises a horizontal distribution ring having a plurality of discharge nozzles.

26. An excessive flame retarding system as in any of claims 21, 22, 11, 12, 23, 1, 2, 3, 4 or 17, wherein the means for activating further comprises a manually operated switch.

* * * * *